United States Patent
Tulshibagwale et al.

(10) Patent No.: US 8,302,168 B2
(45) Date of Patent: Oct. 30, 2012

(54) PUSH ARTIFACT BINDING FOR COMMUNICATION IN A FEDERATED IDENTITY SYSTEM

(75) Inventors: Atul Tulshibagwale, San Jose, CA (US); Jason Rouault, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 973 days.

(21) Appl. No.: 12/261,913

(22) Filed: Oct. 30, 2008

(65) Prior Publication Data
US 2009/0187974 A1    Jul. 23, 2009

Related U.S. Application Data (60) Provisional application No. 61/022,066, filed on Jan. 18, 2008.

(51) Int. Cl.
*G06F 7/04* (2006.01)
(52) U.S. Cl. .................. 726/5; 713/168
(58) Field of Classification Search .......... 726/3–6, 726/12, 14; 713/185, 168, 182, 183; 709/225, 709/229; 707/782, 784
See application file for complete search history.

(56) References Cited

U.S. PATENT DOCUMENTS

| | | | |
|---|---|---|---|
| 7,219,154 B2 * | 5/2007 | Blakley et al. | 709/229 |
| 7,225,464 B2 | 5/2007 | Satyavolu | |
| 7,631,346 B2 * | 12/2009 | Hinton et al. | 726/8 |
| 7,693,959 B2 * | 4/2010 | Leighton et al. | 709/217 |
| 7,784,092 B2 * | 8/2010 | Pearson et al. | 726/8 |
| 7,797,434 B2 * | 9/2010 | Blakley et al. | 709/229 |
| 7,836,484 B2 * | 11/2010 | Pardo-Blazquez et al. | 726/1 |
| 7,921,226 B2 * | 4/2011 | Mukherjee et al. | 709/238 |
| 8,200,971 B2 * | 6/2012 | Edwards | 713/168 |
| 2001/0049753 A1 | 12/2001 | Gary | |
| 2003/0191822 A1 * | 10/2003 | Leighton et al. | 709/219 |
| 2004/0128392 A1 * | 7/2004 | Blakley et al. | 709/229 |
| 2004/0128506 A1 * | 7/2004 | Blakley et al. | 713/170 |
| 2004/0128541 A1 * | 7/2004 | Blakley et al. | 713/201 |
| 2004/0128542 A1 * | 7/2004 | Blakley et al. | 713/201 |
| 2004/0128546 A1 * | 7/2004 | Blakley et al. | 713/201 |
| 2004/0230831 A1 | 11/2004 | Spelman | |
| 2004/0260949 A1 | 12/2004 | Aoki | |
| 2005/0091536 A1 | 4/2005 | Whitmer | |
| 2005/0114701 A1 | 5/2005 | Atkins | |
| 2005/0257258 A1 * | 11/2005 | Kinoshita et al. | 726/12 |
| 2006/0020684 A1 * | 1/2006 | Mukherjee et al. | 709/219 |

(Continued)

OTHER PUBLICATIONS

Web single sign on metadat exchange protocol, Rajeev Angel et al, Apr. 2005, Microsoft corporation and sun Microsystem inc, p. 1-14.*

(Continued)

*Primary Examiner* — Matthew Smithers
*Assistant Examiner* — Abu Sholeman (57) ABSTRACT

A data processing system implements push artifact binding for communication in a federated identity system. A federated identity system in the data processing system comprises an initiator that handles a federated action by determining that a user is to be conveyed to a recipient, constructing an appropriate message request or assertion to be sent to the recipient, and sending the message as a push message over a back-channel communication pathway directed to the recipient's location. The federated identity system further comprises a recipient that handles the federated action by responding to the message by forming a Uniform Resource Locator (URL) to which the user can be directed. The initiator redirects the user to the URL specified in the recipient response.

21 Claims, 10 Drawing Sheets

U.S. PATENT DOCUMENTS

| | | | |
|---|---|---|---|
| 2006/0021019 A1* | 1/2006 | Hinton et al. | 726/10 |
| 2006/0048216 A1* | 3/2006 | Hinton et al. | 726/8 |
| 2006/0129816 A1* | 6/2006 | Hinton | 713/169 |
| 2006/0218234 A1* | 9/2006 | Deng et al. | 709/206 |
| 2006/0218625 A1* | 9/2006 | Pearson et al. | 726/4 |
| 2006/0218628 A1* | 9/2006 | Hinton et al. | 726/8 |
| 2006/0218630 A1* | 9/2006 | Pearson et al. | 726/8 |
| 2006/0236382 A1 | 10/2006 | Hinton | |
| 2007/0067444 A1* | 3/2007 | McCarty et al. | 709/224 |
| 2007/0100944 A1* | 5/2007 | Ford et al. | 709/206 |
| 2007/0156900 A1* | 7/2007 | Chien | 709/225 |
| 2007/0184819 A1* | 8/2007 | Barriga-Caceres et al. | 455/411 |
| 2007/0220268 A1* | 9/2007 | Krishnaprasad et al. | 713/182 |
| 2008/0016232 A1* | 1/2008 | Yared et al. | 709/229 |

OTHER PUBLICATIONS

Implementation of Federated identity in multimedia Messaging service using Liberty Technologoy, Hong Xia Shi, A thesis in department of electrical and computer engineering of concordira university, Mar. 2005, pp. 1-89.*

* cited by examiner

PUSH ARTIFACT BINDING FOR COMMUNICATION IN A FEDERATED IDENTITY SYSTEM

CROSS-REFERENCE TO RELATED APPLICATION

This Utility Patent Application is based on and claims the benefit of U.S. Provisional Application No. 61/022,066, filed on Jan. 18, 2008, the contents of which are hereby incorporated by reference in their entirety.

BACKGROUND

Federated Identity Standards such as SAML (Security Assertion Markup Language), Liberty, and WS-Federation Passive Profile have bindings which use some form of "artifacts" that refer to actual protocol message instances for conveying information sufficient to complete a federated action such as a request for login or a response for login. In a typical sequence of actions, a party initiating the action generates an "artifact" which is a reference to the actual message instance, and redirects the user's browser to the receiving party with the artifact in tow. The receiving party then uses a "backchannel" communication with the initiating party to obtain the actual message based on which the federated action can take place. The initiating party and receiving party can communicate through multiple intermediaries, incurring a penalty in efficiency due to browser redirects through the intermediaries.

To establish trust between federation nodes including endpoints and intermediaries, much information is exchanged including certificate information and URL information at which various federation services are available for the particular node. The information is contained in a document known as meta-data. Any time a federation node has to be relocated to a different network address, the meta-data is updated and propagated to all nodes that trust the relocated node, incurring substantial overhead.

Federation protocols support Post, Redirect, or Artifact bindings for conveying information from one federation node to another. The bindings are described in protocol specification documents for SAML 2.0 or WS-Federation and call for the user to be redirected to each node that is directly trusted by the originating node.

SUMMARY

An embodiment of a data processing system implements push artifact binding for communication in a federated identity system. A federated identity system in the data processing system comprises an initiator that handles a federated action by determining that a user is to be conveyed to a recipient, constructing an appropriate message request or assertion to be sent to the recipient, and sending the message as a push message over a back-channel communication pathway directed to the recipient's location. The federated identity system further comprises a recipient that handles the federated action by responding to the message by forming a Uniform Resource Locator (URL) to which the user can be directed. The initiator redirects the user to the URL specified in the recipient response.

BRIEF DESCRIPTION OF THE DRAWINGS

Embodiments of the invention relating to both structure and method of operation may best be understood by referring to the following description and accompanying drawings.

DETAILED DESCRIPTION

In several system and method embodiments, push artifact binding can be used for communication in Federated Identity Systems.

Push artifact binding is a novel binding that extends existing protocols by switching the order of events in a federated action sequence. An initiating party initiates the back-channel communication over a channel such as a Simple Object Access Protocol (SOAP) channel with the receiving party. The receiving party processes the message and supplies a destination Uniform Resource Locator (URL) to which the user is to be redirected. The "artifact" from existing protocols can be embedded in such a destination URL.

In circumstances and conditions that intermediaries such as federation routers are used in a federated system, the proposed push artifact binding dramatically reduces the number of redirects to complete the federated action and also reduces the amount of information to describe each federation endpoint.

The illustrative push artifact binding first uses back channel communication, specifically in a "push" manner, and then redirects the user, which is distinguished from conventional methods in which the user is redirected first and then the recipient obtains the artifact by "pulling" the artifact from the source.

The various embodiments of techniques and systems with push artifact binding disclosed herein facilitate trust information exchange. Because in the illustrative push artifact binding technique, the URL to which the user is to be redirected is returned in response to a SOAP request that initiates the action. Thus the operation can be performed using only a single URL, the URL at which the SOAP service is available. Furthermore, if the service is always available at a well-known port, such information for any domain can be stored in a globally available information network such as Domain Name Service (DNS), not only eliminating the need for initial meta-data exchange but also enabling flexibility for a node to be relocated without having to worry about updating the meta-data at various other nodes.

Figure 1:
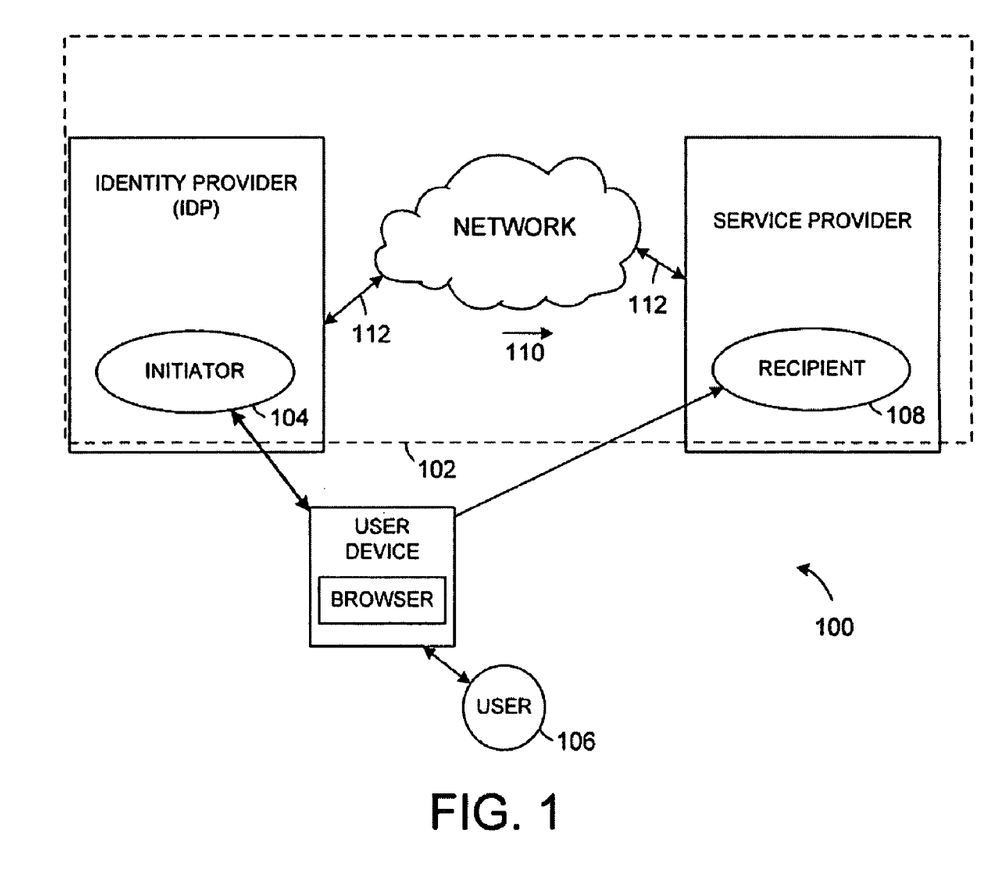
FIG. 1 is a schematic block diagram illustrating an embodiment of a data processing system that implements push artifact binding for communication in a federated identity system.

Referring to FIG. 1, a schematic block diagram illustrates an embodiment of a data processing system 100 that implements push artifact binding for communication in a federated identity system. A federated identity system 102 in the data processing system 100 comprises an initiator 104 that handles a federated action by determining that a user 106 is to be conveyed to a recipient 108, constructing an appropriate message request or assertion 110 to be sent to the recipient 108, and sending the message 110 as a push message over a back-channel communication pathway 112 directed to the recipient's location. The federated identity system 102 further comprises a recipient 108 that handles the federated action by responding to the message by forming a Uniform Resource Locator (URL) to which the user can be directed. The initiator 104 redirects the user 106 to the URL specified in the recipient response.

The federated identity system 102 is thus configured for artifact binding that first uses the back-channel communication pathway 112 for communicating the push message whereby redirection is pushed by the initiator 104 to the recipient 108, followed by redirecting the user.

The recipient 108 can further handle the federated action by combining a unique identifier equivalent to an artifact binding into the Uniform Resource Locator (URL) to which the user can be directed.

In an example implementation, the back-channel communication pathway 112 can conform to a Simple Object Access Protocol (SOAP).

Figure 2:
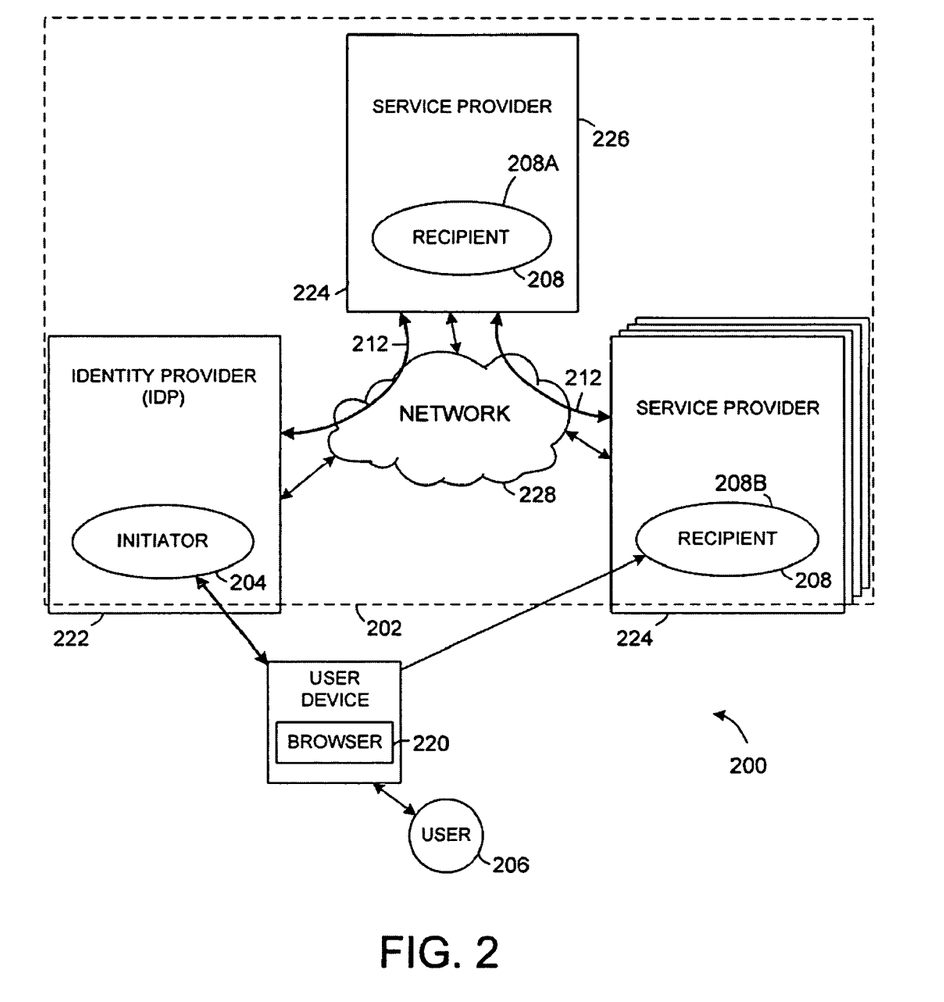
FIG. 2 is a schematic block diagram showing another embodiment of a data processing system with federated identity system push artifact binding.

Referring to FIG. 2, a schematic block diagram illustrates another embodiment of a data processing system 200 with federated identity system push artifact binding. The illustrative data processing system 200 comprises a web browser 220 for operation by the user 206. The data processing system 200 further comprises an identity provider (IDP) 222 for operation as the initiator 204 or the recipient 208 and a service provider (SP) 224 for operation as the recipient 208 or the initiator 204, whereby for an IDP initiator the recipient is SP and for an SP initiator the recipient is IDP.

In a federated identity system 202, the main components are an end-user 206 with the browser 220, an initiator 204 of the federation action such as an IDP 222 or an SP 224, optionally an intermediary 226 such as a federation router/broker/proxy, and a recipient 208 of the federation action. The recipient 208 is the opposite of the initiator 204, hence if the initiator is an IDP, the recipient is an SP and vice versa.

Each node in the federated identity system 202 maintains a trust relationship with other nodes in the system. The trust relationship is "asymmetric" in that each trust relationship is between an IDP 222 and an SP 224 or vice-versa, but never between an IDP 222 and another IDP 222, or an SP 224 and another SP 224. Two nodes can have a mutual trust relationship as both IDPs and SPs, but in that case those have two separate trust relationships. An intermediary 226 appears as an IDP to an SP and as an SP to an IDP. A node typically maintains a list of other trusted nodes. A federated identity network 228 is the set of nodes formed by the union of spanning walks originating at each node on the directional graph formed by individual trust relationships between nodes.

From the initiator's point of view, an intermediary 226 is a recipient since the initiator does not know how the action is going to be propagated beyond the immediate trust relationship that is maintained. A federation action in such a federated identity network 228 can be a request for login, logout, name management, and the like; or a response/assertion for login, logout, name management, and others. Such actions are described in detail in any of the standards specifications such as SAML, Liberty, and WS-Federation specification documents.

The illustrative data processing system 200 reduces the number of redirects. A federated identity system 202 typically includes federation end points such as Identity Providers (IDPs) 222 and Service Providers (SPs) 224. In addition to the end points, the federated identity system 202 can also include zero or more Federation Routers that act as intermediaries 226 between IDPs 222 and SPs 224. In absence of the illustrative push artifact binding technique and associated system, a user of a browser-based federation protocols such as SAML 2.0, Liberty ID-FF, WS-Federation passive profile redirects between each one of the intermediaries to arrive at the final destination. The number of redirects is always one plus the number of intermediaries. A higher number of redirects results in substantial degradation in latency and noticeable audio clicks and perhaps flashing pages for the user. The redirects are also highly inappropriate for access from a mobile device, and often the number of redirects is limited on many devices, for example to less than five.

Using the illustrative push artifact binding described herein, the user 206 is redirected only once to the final destination, regardless of the number of intermediaries 226 to be present, enabling a potentially unlimited number of intermediaries 226 to be present without substantially degrading the user experience.

In some embodiments, the data processing system 200 can further comprise one or more intermediaries 226 such as a federation router, broker, proxy that for communication from the initiator to the recipient, or other suitable device. The intermediary 226 is optional. The system 200 is fully operational without an intermediary and with intermediaries.

For example, the data processing system 200 can further comprise a final recipient 208 and a potentially unlimited number of intermediaries 226 configured for propagating from the final recipient through to the initiator 204 with only a single redirect of the user's web browser 220.

In an illustrative embodiment, the data processing system 200 can further comprise a first recipient 208A, a second recipient 208B, and an intermediary 226. The first recipient 208A can be configured to handle the federated action by determining that the user 206 is to be conveyed to the second recipient 208B whereby the first recipient 208A is operative as an intermediary, and sending the message over the back-channel communication pathway 212 directed to the second recipient's location, whereby a back-channel response from the second recipient 208B that contains a Uniform Resource Locator (URL) is propagated to the initiator 204 in a communication that passes through the first recipient 208A. The initiator 204 is configured to redirect the user 206 with only a single redirect to the URL received in the back-channel response of the second recipient 208B conveyed to the initiator 204 by the intermediary 226.

The intermediary 226 can be configured to handle the federated action by determining that the user 206 is to be conveyed to an additional recipient, sending the message over the back-channel communication pathway 212 directed to the additional recipient's location, and performing the determining and sending actions for the one or more additional recipients to a final recipient, whereby a back-channel response from the additional recipient or recipients is propagated back to the initiator 204 over the back-channel communication pathway 212 and the initiator 204 then redirects the user 206 with only a single redirect of the user 206 to the URL specified in the response of the final recipient.

Figure 3A:
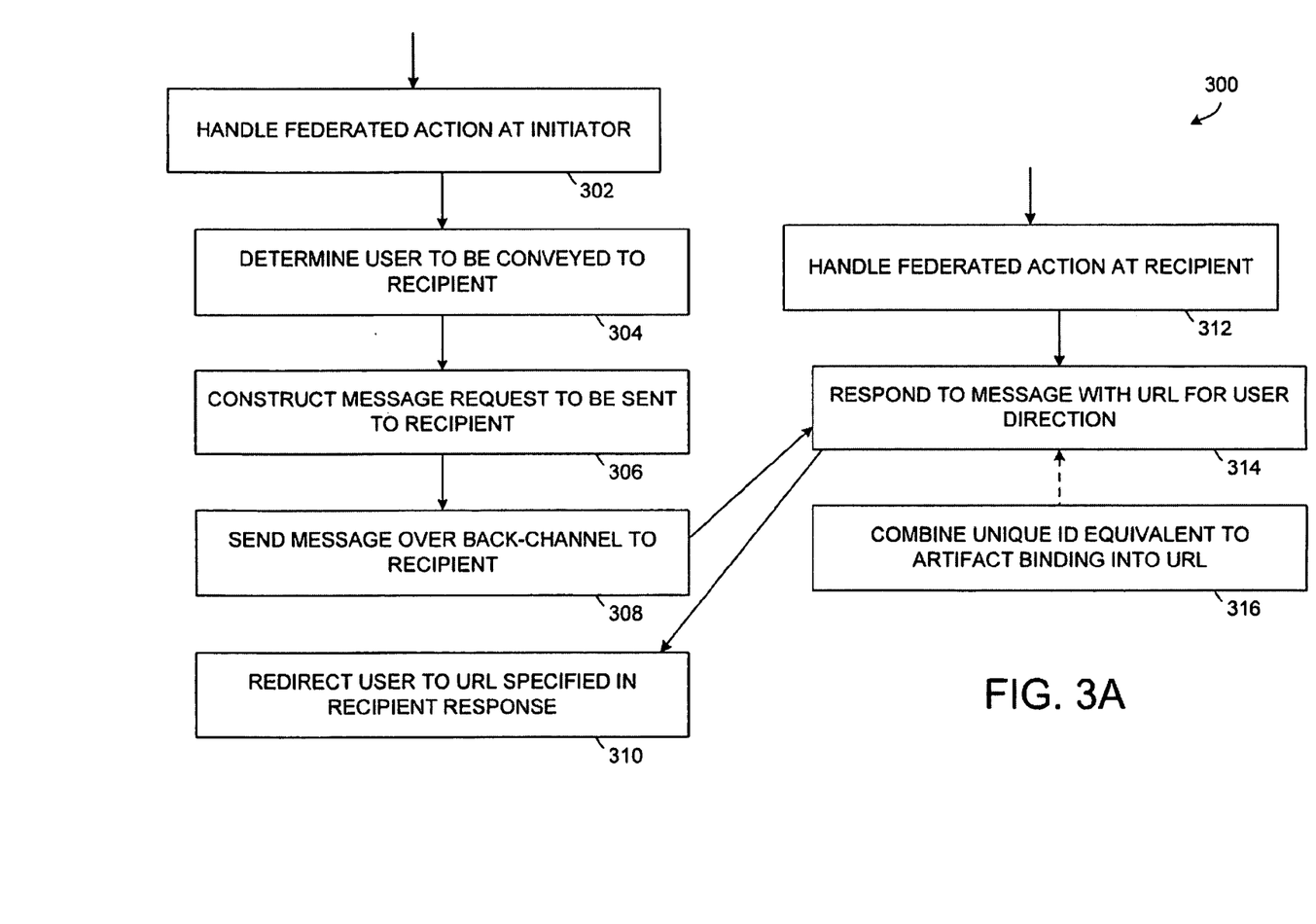
FIGS. 3A through 3C are flow charts that depict one or more embodiments or aspects of a computer-executed method for push artifact binding for communication in a federated identity system.
Figure 3B:
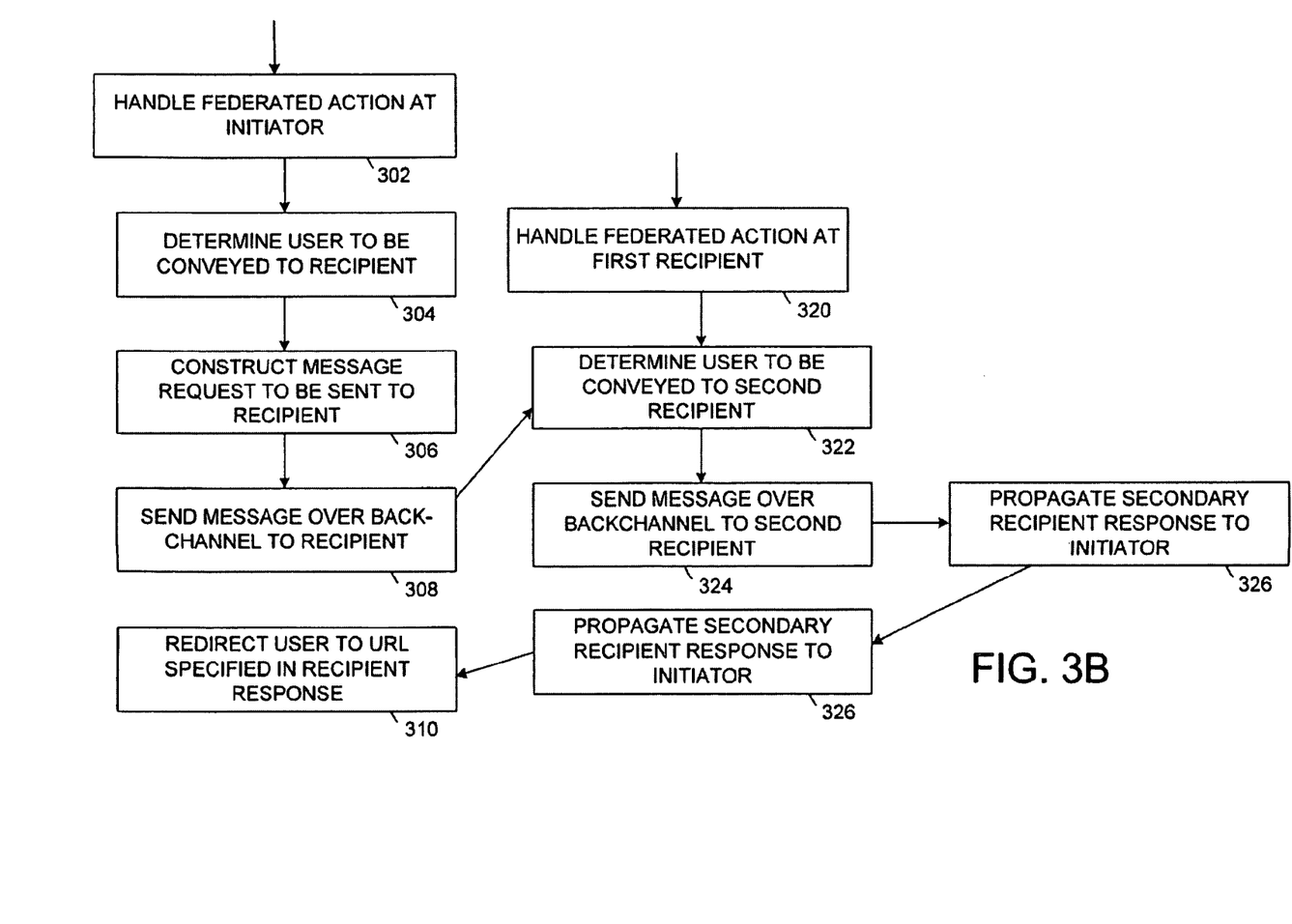
Figure 3C:
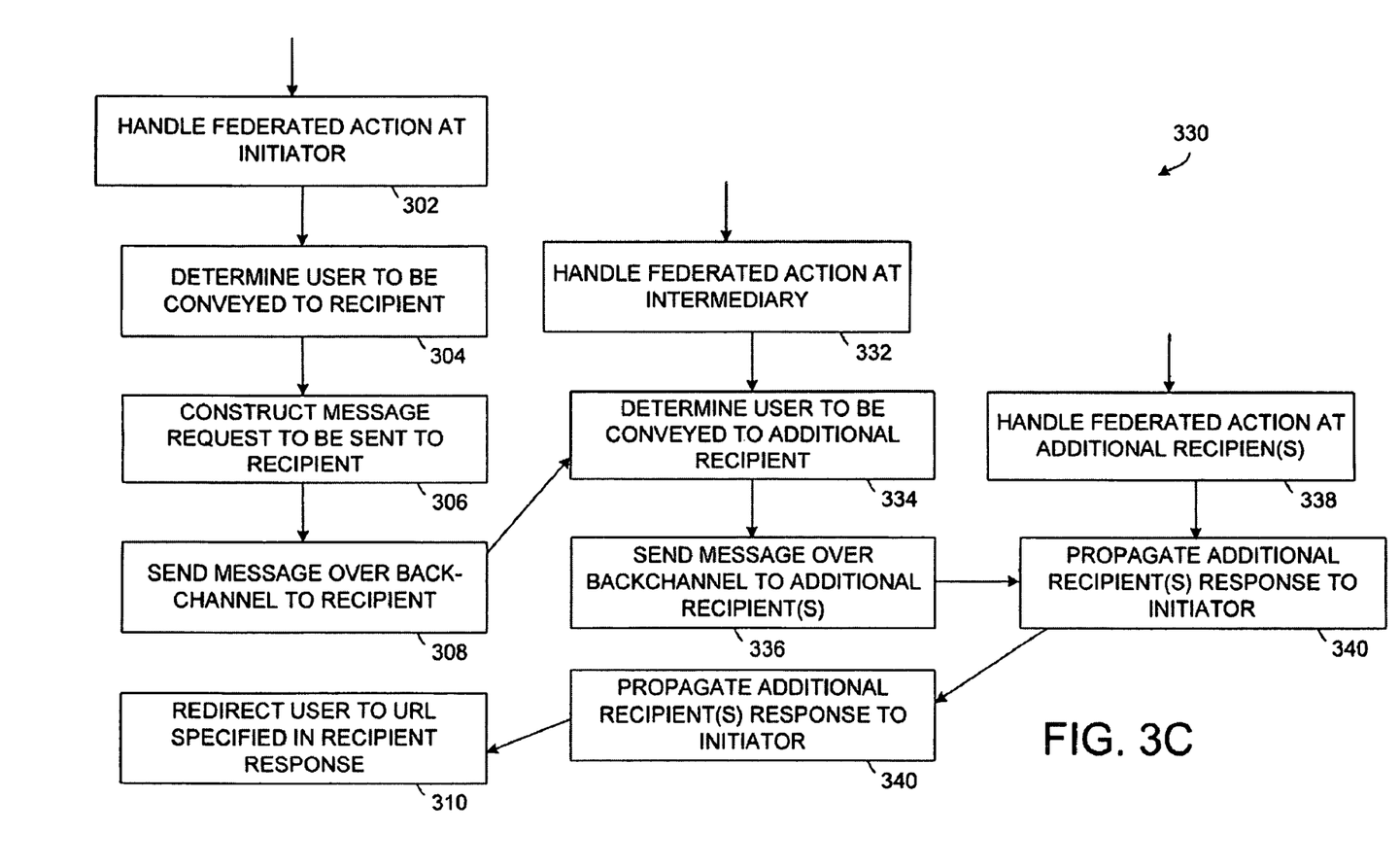

Referring to FIGS. 3A through 3C, flow charts illustrate one or more embodiments or aspects of a computer-executed method 300 for push artifact binding for communication in a federated identity system. FIG. 3A depicts a computer-executed method 300 for communicating in a federated identity system comprising handling 302 a federated action at an initiator and handling 312 the federated action at a recipient. At the initiator the handling method 302 comprises determining 304 that a user is to be conveyed to a recipient, constructing 306 an appropriate message request or assertion to be sent to the recipient, and sending 308 the message over a back-channel communication pathway directed to the recipient's location. At the recipient the handling method 312 comprises responding 314 to the message by forming a Uniform Resource Locator (URL) which includes an artifact or unique identifier to which the user can be directed. In response, the initiator 302 redirects 310 the user to the URL specified in the recipient response.

In an example embodiment, the recipient can handle 312 the federated action by combining 316 a unique identifier equivalent to an artifact binding into the Uniform Resource Locator (URL) to which the user can be directed.

In an example implementation, the user is an end-user acting with a web browser, the initiator is an identity provider (IDP) or a service provider (SP), and the recipient is a service provider (SP) or an identity provider (IDP) whereby for an IDP initiator the recipient is SP and for an SP initiator the recipient is IDP.

The illustrative technique 300 enables replacement of many Uniform Resource Locators (URLs) for many corresponding federation node services by a single address for a back-channel communication service URL whereby the user is redirected to one of the URL plurality as specified in the response by the recipient and redirection URLs are specified dynamically in the response by the recipient of the backchannel communication.

The back-channel communication pathway can conform to a Simple Object Access Protocol (SOAP).

In an embodiment of a computer-executed federated identity communication method shown in FIG. 3B, handling 320 the federated action at the recipient that is a first recipient can further comprise determining 322 that the user is to be conveyed to a second recipient whereby the first recipient is operative as an intermediary, and sending 324 the message over the back-channel communication pathway directed to the second recipient's location, whereby a back-channel response from the second recipient is propagated 326 to the initiator by traversing back through the chain of intermediaries.

In the illustrative embodiment, the response is communicated 324 to the original initiator by the intermediary using the back channel only, so the redirect is directly from the initiator to the final recipient, thus the intermediary does not deal with redirects.

In an example configuration, the initiator and the recipient can communicate via at least one intermediary that is a federation router, broker, or proxy. The communication can propagate from a final recipient through a potentially unlimited number of intermediaries to the initiator with only a single redirect of the user. However, the method is highly useful even in the case of no proxies or intermediaries, since the back-channel message request and response precede the redirect.

Referring to FIG. 3C, in some embodiments a computer-executed federated identity communication method 330 further comprises handling 332 the federated action at the intermediary by determining 334 that the user is to be conveyed to an additional recipient and sending 336 the message over the back-channel communication pathway directed to the additional recipient's location. The determining and sending actions can be performed 338 for one or more additional recipients to a final recipient, whereby a back-channel response from the additional recipient or recipients is propagated 340 to the initiator through all intermediaries.

Figure 4A:
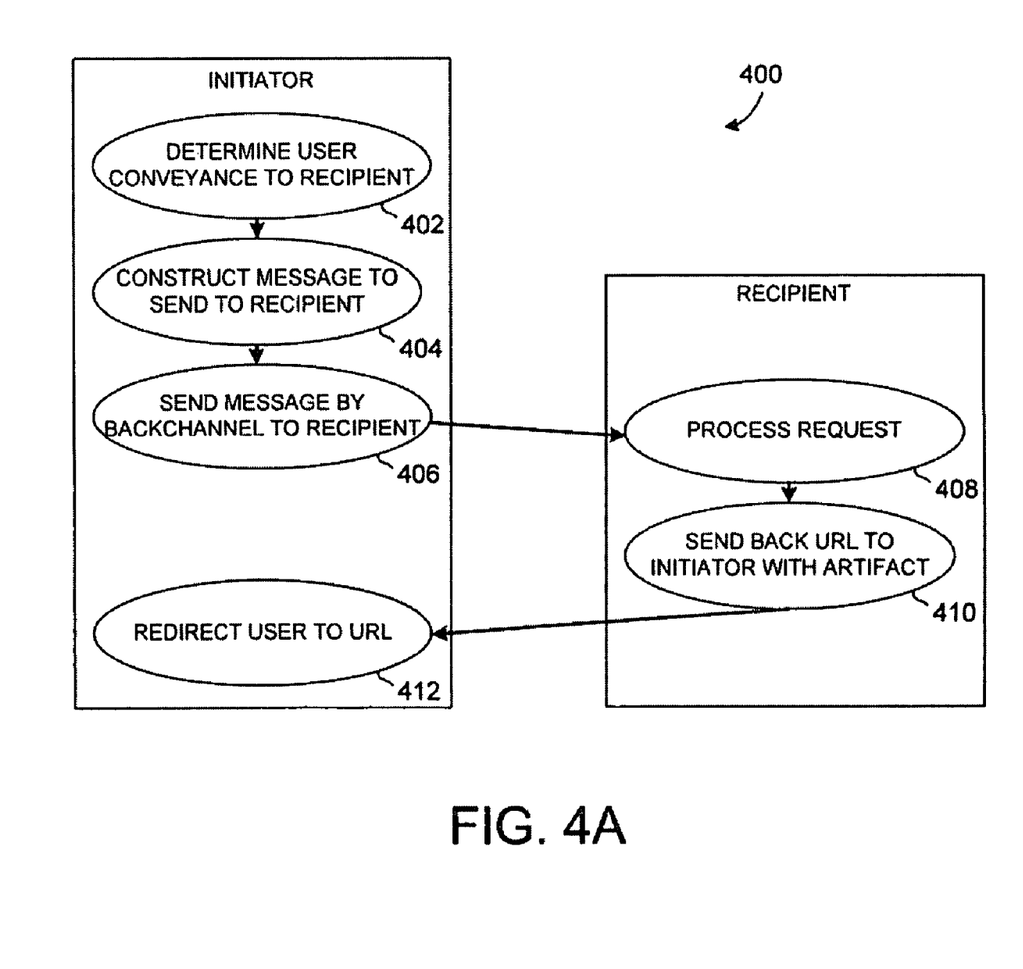
FIGS. 4A and 4B are flow charts illustrating one or more embodiments or aspects of another computer-executed method for push artifact binding for communication in a federated identity system.
Figure 4B:
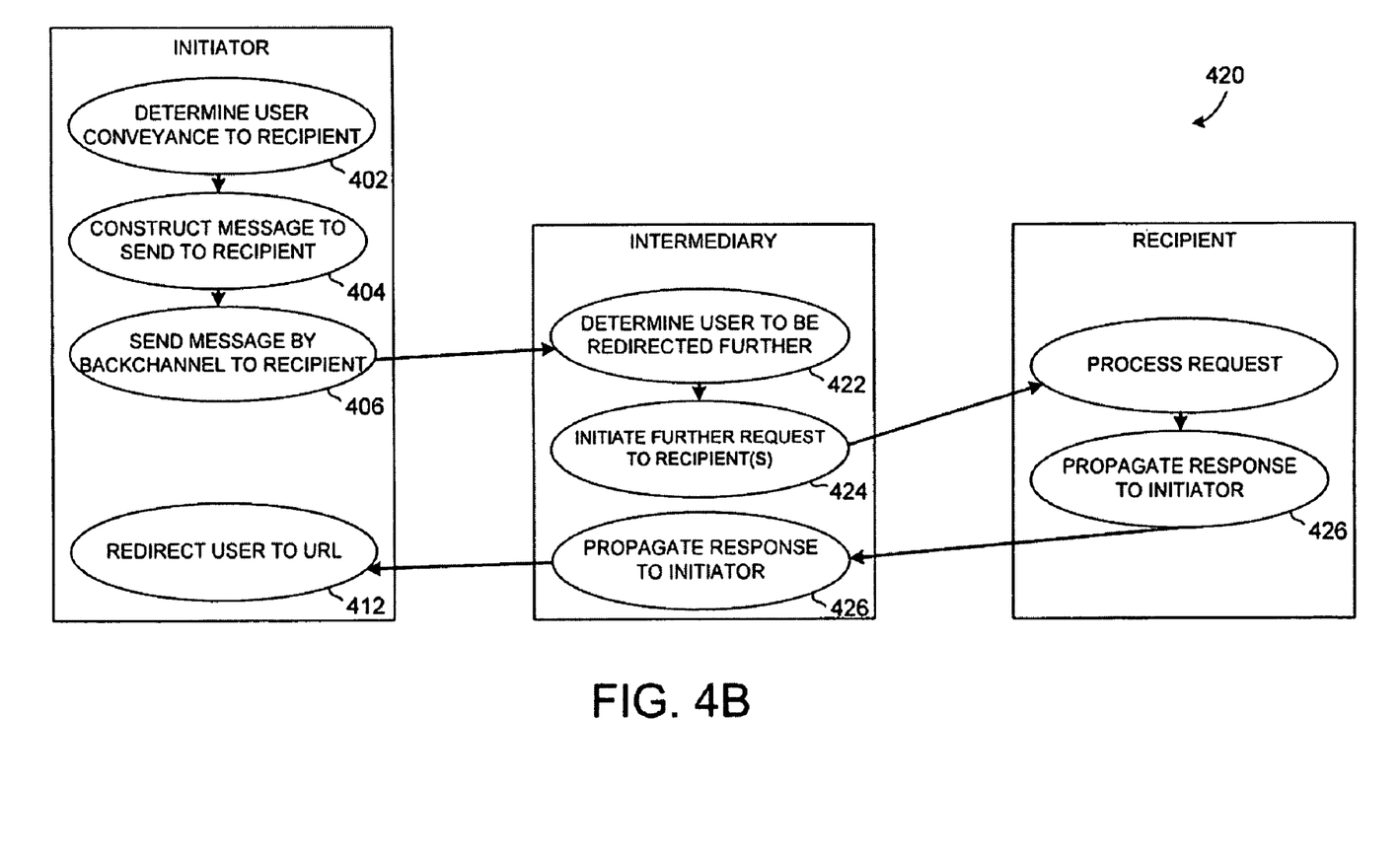

Referring to FIGS. 4A and 4B, flow charts illustrate one or more embodiments or aspects of a computer-executed method 400 for push artifact binding for communication in a federated identity system. As shown in FIG. 4A, an initiator determines 402 that a user is to be conveyed to a recipient and the initiator constructs 404 an appropriate message, a request or assertion, to be sent to the recipient. The initiator sends 406 the message over a back-channel pathway, for example a Simple Object Access Protocol (SOAP) channel by initiating a SOAP RPC designating the well-known location of the recipient's SOAP service. The recipient processes 408 the SOAP request and, under normal processing, responds with a URL to which the user may be redirected. The URL that is sent back 410 by the recipient may contain a unique identifier equivalent to the "artifact" in traditional Artifact bindings. The initiator redirects 412 the user to the URL specified in the SOAP response from the recipient.

Referring to FIG. 4B, in some conditions 420, the recipient of the SOAP request can determine 422 that the user actually is to be redirected to another recipient and thus acting as an intermediary. Between receiving the SOAP request and sending the SOAP response, the intermediary initiates 424 another SOAP request that may be derived from the received request to what is determined to be a final recipient. The process can be followed transitively until the final destination is reached. The SOAP response from the final destination is thus propagated 426 all the way to the original initiator through all intermediaries with only a single redirect for the user.

Figure 5A:
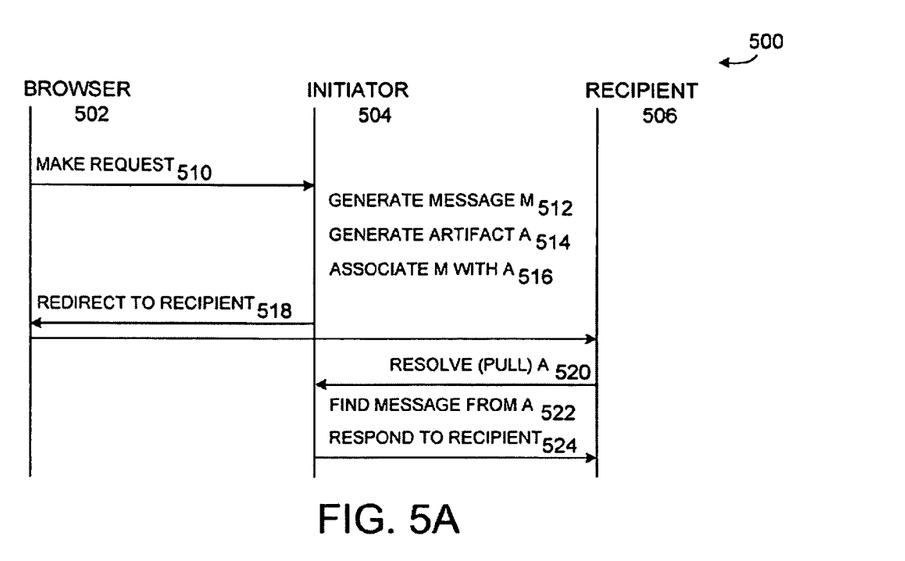
FIGS. 5A and 5B are flow diagrams respectively showing an example of pull artifact binding of conventional federated identity system operation in comparison to an embodiment of the push artifact binding disclosed herein for communication with a single recipient.
Figure 5B:
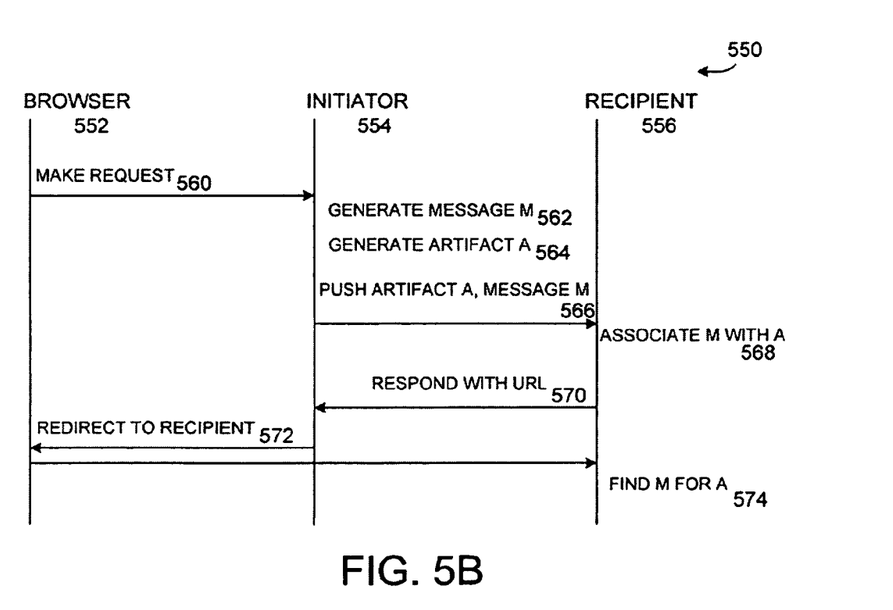

Referring to FIGS. 5A and 5B, flow diagrams respectively show an example of pull artifact binding of conventional federated identity system operation in comparison to an embodiment of the push artifact binding disclosed herein for communication with a single recipient. In the pull artifact binding example 500 shown in FIG. 5A, a browser 502 makes a request 510 to an initiator 504. The initiator 504 responds by generating 512 a message M, generating 514 an artifact A, and associating 516 the message M with the artifact A. The initiator 504 redirects 518 the user to a recipient 506 using the artifact A. The recipient 506 resolves or pulls 520 the artifact A from the initiator 504. The initiator 504 finds 522 the message M corresponding to the artifact A. The initiator 504 responds 524 to the recipient 506 with the message M.

In contrast, as shown in FIG. 5B in the push artifact binding technique, a browser 552 makes a request 560 to an initiator 554. The initiator 554 responds by generating 562 a message M and generating 564 an artifact A. The initiator 554 pushes 566 the artifact A and the message M to the recipient 556. The recipient 556 associates 568 the message M with the artifact A. The recipient 556 responds 570 with a URL to which the user can be redirected. The initiator 554 redirects 572 the user to the URL specified by the recipient 556. The recipient 506 finds 574 the message M corresponding to the artifact A.

Figure 6A:
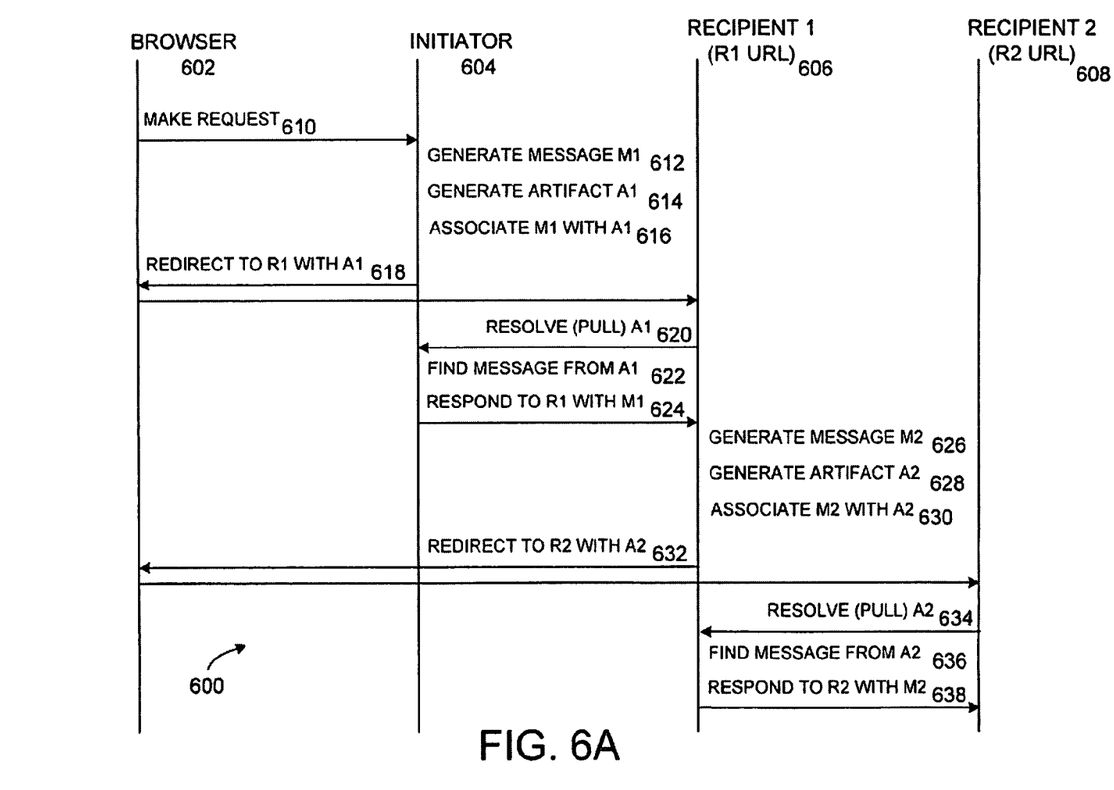
FIGS. 6A and 6B are flow diagrams respectively depicting an example of pull artifact binding of conventional federated identity system operation in comparison to an embodiment of the push artifact binding disclosed herein for communication with multiple recipients, as exemplified for two recipients.
Figure 6B:
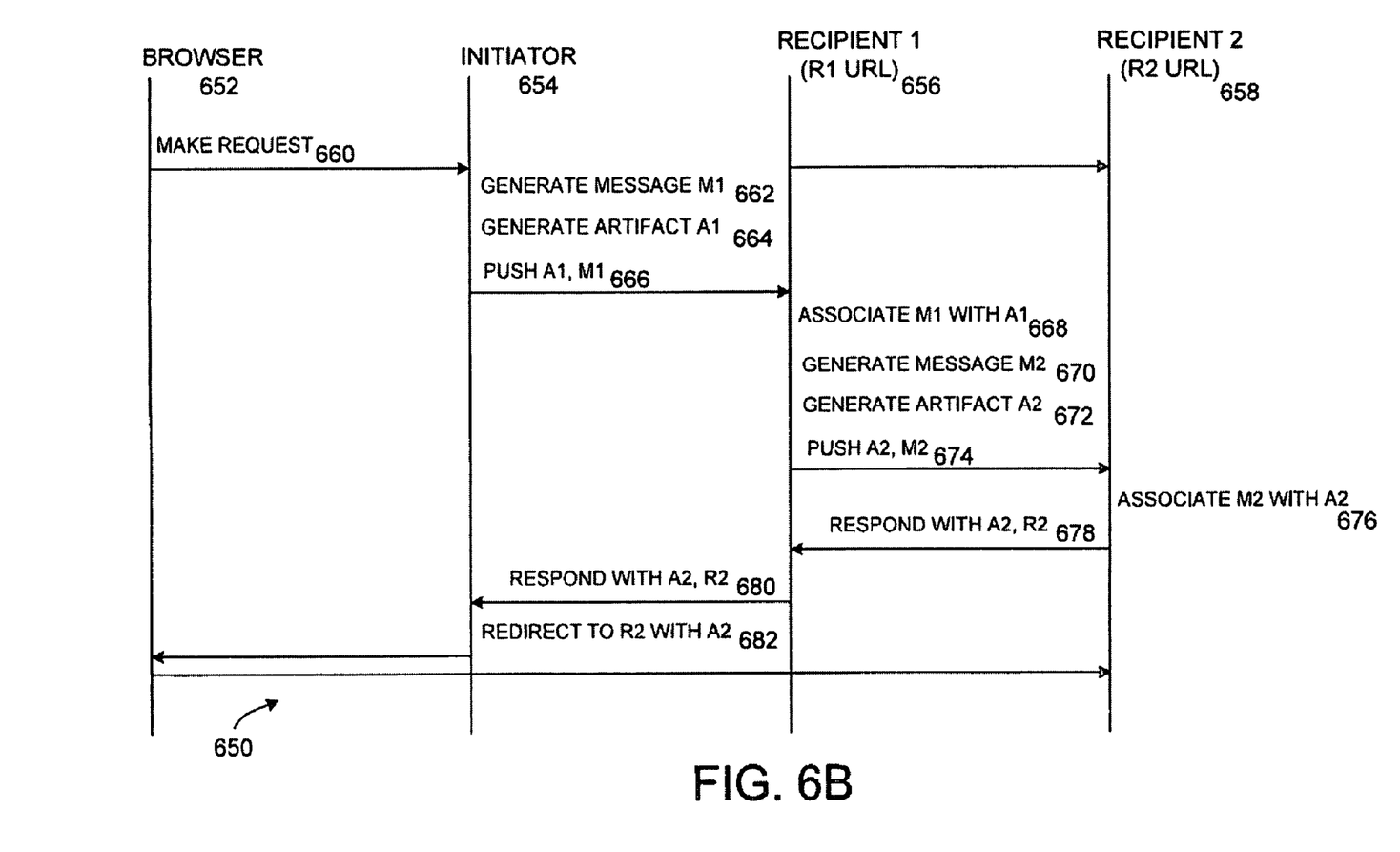

Referring to FIGS. 6A and 6B, flow diagrams respectively show an example of pull artifact binding of conventional federated identity system operation in comparison to an embodiment of the push artifact binding disclosed herein for communication with multiple recipients, as exemplified for two recipients. In the pull artifact binding example 600 shown in FIG. 6A, a browser 602 makes a request 610 to an initiator 604. The initiator 604 responds by generating 612 a message M1, generating 614 an artifact A1, and associating 616 the message M1 with the artifact A1. The initiator 604 redirects 618 the user to a first recipient 606 using the artifact A1. The first recipient 606 resolves or pulls 620 the artifact A1 from the initiator 604. The initiator 604 finds 622 the message M1 corresponding to the artifact A1. The initiator 604 responds 624 to the recipient 606 with the message M1. The first recipient 606 responds by generating 626 a message M2, generating 628 an artifact A2, and associating 630 the message M2 with the artifact A2. The first recipient 606 redirects 632 the user to a second recipient 608 using the artifact A2. The second recipient 608 resolves or pulls 634 the artifact A2 from the first recipient 606. The first recipient 606 finds 636 the message M2 corresponding to the artifact A2. The first recipient 606 responds 638 to the second recipient 608 with the message M2.

In contrast, as shown in FIG. 6B in the push artifact binding technique 650, a browser 652 makes a request 660 to an initiator 654. The initiator 654 responds by generating 662 a message M1 and generating 664 an artifact A1. The initiator 654 pushes 666 the artifact A1 and the message M1 to the first recipient 656. The first recipient 656 associates 668 the message M1 with the artifact A1. The first recipient 656 responds by generating 670 a message M2 and generating 672 an artifact A2. The first recipient 656 pushes 674 the artifact A2 and the message M2 to the second recipient 658. The second recipient 658 associates 676 the message M2 with the artifact A2. A response is propagated as the second recipient 658 responds 678 with a URL to which the user can be redirected. The first recipient 656 receives the response 678 from the second recipient 658 and responds 680 with a URL to which the user can be redirected, which is propagated to the initiator 654. The initiator 654 redirects 682 the user to the URL specified by the second recipient 656. The URL is thus propagated from the final recipient 658 through all intermediaries (the first recipient 656 in the illustrative example, although any number of intermediaries can be used in other examples) to the initiator 654 with the overhead of only a single redirect 682.

The illustrative techniques and systems for push artifact binding for communication in federated identity systems improve performance and efficiency in several aspects. Push artifact binding techniques avoid communication using multiple redirects. Bindings including POST, Redirect, and Artifact bindings of the conventional browser-based federated identity protocols including SAML 1.x and 2.0, Liberty IDFF 1.x, WS-Federation Passive Profile, and the like impose a number of redirects that is one plus the number of intermediaries. The push artifact binding techniques disclosed herein are capable of reducing the number of redirects to exactly one, enabling the federated identity network to scale to have potentially numerous intermediaries for any user transaction.

The push artifact binding techniques and systems disclosed herein further reduce overhead, handling, storage, and inefficiency of trust information. In conventional implementations of a federated identity system, the meta-data of a federated identity node contains numerous URLs for various services offered by the federation node, including Single Sign-On, Single Logout/Global Logout, Name Management, Federation Termination, SOAP service URL, and the like, all of which, using the push artifact binding techniques and systems described herein, can be replaced by a single address for a SOAP service URL wherein the user may be redirected to the appropriate URL specified in the SOAP response by the recipient.

The illustrative push artifact binding techniques and systems also facilitate and improve usage of public information services such as Domain Name Service (DNS) for federation information. The push artifact binding techniques and systems reduce the number of URLs that are required to be known to federate with a node to only one, if the SOAP service is always made available at a well-known port, DNS can be used to create the federated identity record for a particular network domain. In the event of a node relocation/reconfiguration, maintaining such information in a DNS record eliminates the need for manually updating meta-data information at each trusted node.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modification, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system comprising:
a service provider addressable through a Uniform Resource Locator and to offer a plurality of services associated with corresponding second Uniform Resource Locators stored in a federated identity record at a Domain Name Service; and
an identity provider to handle a federated action by determining that a user request is to be conveyed to the service provider, retrieving one of the second Uniform Resource Locators from the federated identity record at the Domain Name Service corresponding to a federated service in the user request, and sending a request or assertion as a push message over a back-channel communication pathway to the service provider at the one of the second Uniform Resource Locators, the service provider to handle the federated action by sending a response to the message over the back-channel communication pathway to the identity provider including a third Uniform Resource Locator to which the user is to be directed, and the identity provider to redirect the user to the third Uniform Resource Locator specified in the response.

2. The system according to claim 1 further comprising:
the identity provider to perform artifact binding to first use the back-channel communication pathway to communicate the push message to push redirection by the identity provider to the service provider at the one of the second Uniform Resource Locators, followed by redirecting the user.

3. The system according to claim 1 further comprising:
the identity provider to operate as an initiator or a recipient; and
the service provider to operate as the initiator when the identity provider operates as the recipient, and to operate as the recipient when the identity provider operates as the initiator.

4. The system according to claim 3 further comprising:
at least one intermediary comprising a federation router, broker, or proxy to communicate from the initiator to the recipient.

5. The system according to claim 1 further comprising:
the service provider to further handle the federated action by combining a unique identifier equivalent to an artifact binding into the third Uniform Resource Locator to which the user is to be directed.

6. The system according to claim 1 further comprising:
the service provider to handle the federated action by determining that the user request is to be conveyed to a second service provider, the service provider to operate as an intermediary by sending the message over the back-channel communication pathway to the second service provider without redirecting the user to the second service provider, the second service provider to send the third Uniform Resource Locator over the back-channel communication pathway to the identity provider via the service provider operating as an intermediary.

7. The system according to claim 6 further comprising:
the service provider to handle the federated action by determining that the user request is to be conveyed to an additional service provider, sending the message over the back-channel communication pathway to the additional service provider, and performing the determining and sending actions for at least one additional service provider to a final service provider, wherein a back-channel response from the at least one additional service provider is to propagate to the identity provider over the back-channel communication pathway, and the identity provider is to redirect the user with only a single redirect, the single redirect directed to the third Uniform Resource Locator specified in the response of the final service provider.

8. The system according to claim 1 further comprising:
a final service provider; and
a plurality of intermediaries to propagate a response from the final service provider through to the identity provider to cause only a single redirect of the user in response to the user request to reach the federated service.

9. The system according to claim 1 wherein:
the back-channel communication pathway is based on a Simple Object Access Protocol (SOAP).

10. A method to communicate in a federated identity system comprising:

for a service provider addressable through a Uniform Resource Locator, storing second Uniform Resource Locators corresponding to a plurality of services offered by the service provider in a federated identity record at a Domain Name Service;
handling a federated action at an identity provider by:
determining that a user request is to be conveyed to the service provider;
retrieving one of the second Uniform Resource Locators from the federated identity record at the Domain Name Service corresponding to a federated service in the user request; and
sending a request or assertion as a push message over a back-channel communication pathway to the service provider at the one of the second Uniform Resource Locators;
handling the federated action at the service provider by sending a response to the message over the back-channel communication pathway to the identity provider including a third Uniform Resource Locator to which the user is to be directed; and
redirecting the user to the third Uniform Resource Locator specified in the response.

11. The method according to claim 10 further comprising handling the federated action at the service provider by combining a unique identifier equivalent to an artifact binding into the third Uniform Resource Locator to which the user is to be directed.

12. The method according to claim 10 further comprising:
handling the federated action at the service provider by:
determining that the user request is to be conveyed to a second service provider, the service provider to operate as an intermediary by sending the message over the back-channel communication pathway to the second service provider without redirecting the user to the second service provider, the second service provider to send the third Uniform Resource Locator over the back-channel communication pathway to the identity provider via the second service provider operating as an intermediary.

13. The method according to claim 12 further comprising:
handling the federated action at the service provider by:
determining that the user request is to be conveyed to an additional service provider;
sending the message over the back-channel communication pathway to the additional service provider; and
performing the determining and sending actions for at least one additional service provider to a final service provider, wherein a back-channel response from the at least one additional service provider is to propagate to the identity provider over the back-channel communication pathway, and the identity provider is to redirect the user with only a single redirect, the single redirect directed to the third Universal Resource Locator specified in the response of the final service provider.

14. The method according to claim 10 wherein:
the identity provider is to operate as an initiator or a recipient; and
the service provider is to operate as the initiator when the identity provider operates as the recipient, and to operate as the recipient when the identity provider operates as the initiator.

15. The method according to claim 10 further comprising:
the identity provider and the service provider to communicate via at least one intermediary that is a federation router, broker, or proxy.

16. The method according to claim 10 further comprising:
propagating from a final service provider through a plurality of intermediaries to the identity provider to cause only a single redirect of the user in response to the request to reach the federated service.

17. The method according to claim 10 further comprising:
replacing a plurality of Uniform Resource Locators associated with a plurality of federation node services by a single back-channel communication service Uniform Resource Locator, wherein the single back-channel communication service Uniform Resource Locator is the third Uniform Resource Locator to redirect the user to one of the plurality of Uniform Resource Locators.

18. A tangible computer readable storage device or storage disk comprising instructions to, at least:
cause a controller in a service provider addressable through a Uniform Resource Locator to store second Uniform Resource Locators corresponding to a plurality of services offered by the service provider in a federated identity record at a Domain Name Service;
cause a controller in an identity provider to determine that a user request is to be conveyed to the service provider;
cause the controller in the identity provider to retrieve one of the second Uniform Resource Locators from the federated identity record at the Domain Name Service corresponding to a federated service in the user request;
cause the controller in the identity provider to send a request or assertion as a push message over a back-channel communication pathway to the service provider at the one of the second Uniform Resource Locators;
cause the controller in the service provider to send a response to the message over the back-channel communication pathway to the identity provider including a third Uniform Resource Locator to which the user is to be directed;
cause the controller in the service provider to combine a unique identifier equivalent to an artifact binding into the third Uniform Resource Locator to which the user is to be directed; and
cause the controller in the identity provider to redirect the user to the third Universal Resource Locator specified in the response.

19. The tangible computer readable storage device or storage disk according to claim 18 further comprising instructions to, at least:
cause the controller in the service provider to determine that the user request is to be conveyed to a second service provider, the service provider to operate as an intermediary by sending the message over the back-channel communication pathway to the second service provider without redirecting the user to the second service provider, wherein the instructions cause a controller in the second service provider to send the third Uniform Resource Locator over the back-channel communication pathway to the identity provider.

20. The tangible computer readable storage device or storage disk according to claim 19 further comprising instructions to, at least:
cause the controller in the service provider to determine that the user request is to be conveyed to an additional service provider;
cause the controller in the service provider to send the message over the back-channel communication pathway to the additional service provider; and
cause the controller in the service provider to determine that the user request is to be conveyed to an additional service provider, the instructions to cause a controller in the additional service provider to send the message to a final service provider, wherein a back-channel response from the at least one additional service provider is to propagate to the identity provider over the back channel communication pathway.

21. The system according to claim 1 wherein retrieving the one of the second Universal Resource Locators from the federated identity record at the Domain Name Service comprises not relying on an initial meta-data exchange between the identity provider and the service provider.

* * * * *